United States Patent [19]

Gregorian et al.

[11] Patent Number: 5,204,854
[45] Date of Patent: Apr. 20, 1993

[54] ADAPTIVE HYBRID

[75] Inventors: Roubik Gregorian, San Jose; Earl Gibson, Milpitas, both of Calif.

[73] Assignee: Sierra Semiconductor Corporation, San Jose, Calif.

[21] Appl. No.: 749,267

[22] Filed: Aug. 23, 1991

[51] Int. Cl.$^5$ ............................................. H04B 3/23
[52] U.S. Cl. ................................ 370/32.1; 379/406; 379/410
[58] Field of Search ................ 370/32.1; 379/406, 410

[56] References Cited

U.S. PATENT DOCUMENTS

| | | | |
|---|---|---|---|
| 3,922,505 | 11/1975 | Höge | 379/410 |
| 4,334,128 | 6/1982 | Snijders | 379/410 X |
| 4,669,115 | 5/1987 | Messerschmidtt | 379/410 X |
| 4,922,530 | 5/1990 | Kenney et al. | 370/32.1 X |
| 5,014,263 | 5/1991 | Vairavan et al. | 370/32.1 |

OTHER PUBLICATIONS

An Electronic Hybrid for Adaptive Balance in Telephony, "IEEE Transactions on Comm.", Aug. 1980, pp. 1399.
Dotter et al., "Implementation of an Adaptive Balancing Hybrid," COM-28, p. 1408, Aug. 1980.
White, "An Adaptive Electronic Hybrid Transformer,-"IEEE Transactions on Comm., Dec. 1972.

Primary Examiner—Douglas W. Olms
Assistant Examiner—Russell W. Blum
Attorney, Agent, or Firm—Burns, Doane, Swecker & Mathis

[57] ABSTRACT

Echo attenuation facilitates achievement of efficient, full-duplex data communications on two-wire channels. Major advantages are achieved by using an adaptive hybrid in conjunction with echo cancellation. When needed, the adaptive hybrid reduces the amplitude range requirements on the echo canceller and on analog-to-digital conversion, thereby reducing overall cost. This reduction in range requirements reduces the digital word-size required for high-performance echo cancellation and reduces the bit-accuracy needed in the analog-to-digital converter. These reductions in needed word-size and bit accuracy substantially reduce implementation cost. Normally, the adaptive hybrid is used to reduce near-end echoes, which are usually much larger than far-end echoes. The echo canceller attenuates the remaining near-end echo and the far-end echo. Two major objectives are: (1) Cost effectiveness and (2) versatile, effective correction of echoes with various, realistic characteristics. Both objective are achieved in accordance with the teachings of this invention by employing simple but multiple stages. A special training algorithm is also taught.

9 Claims, 6 Drawing Sheets

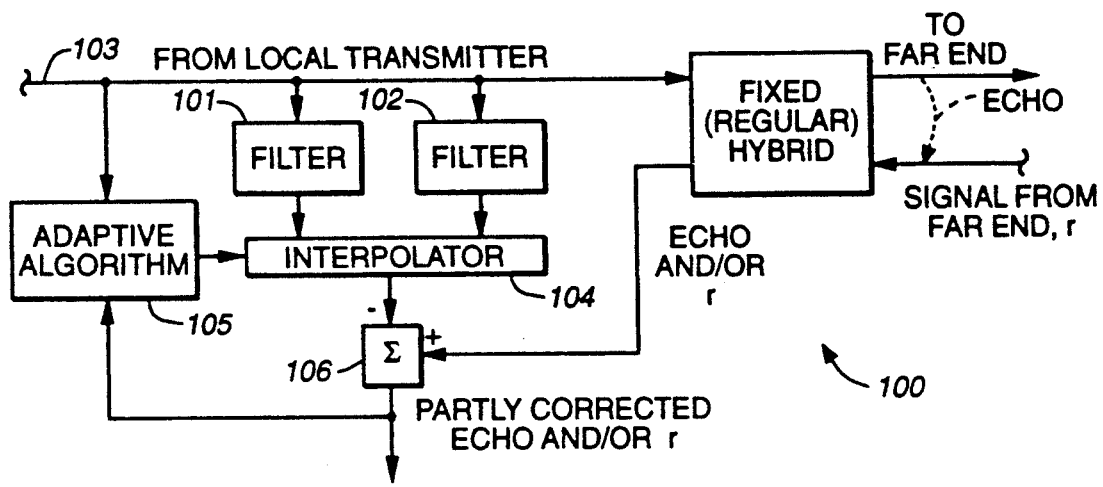
FIG._1
*(PRIOR ART)*
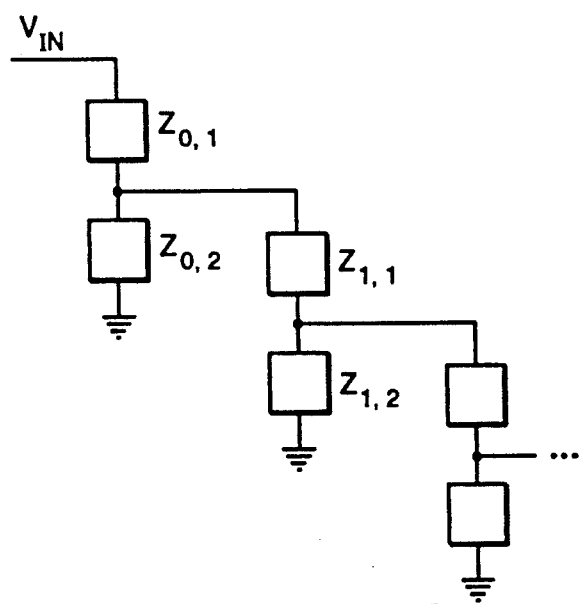
FIG._3A

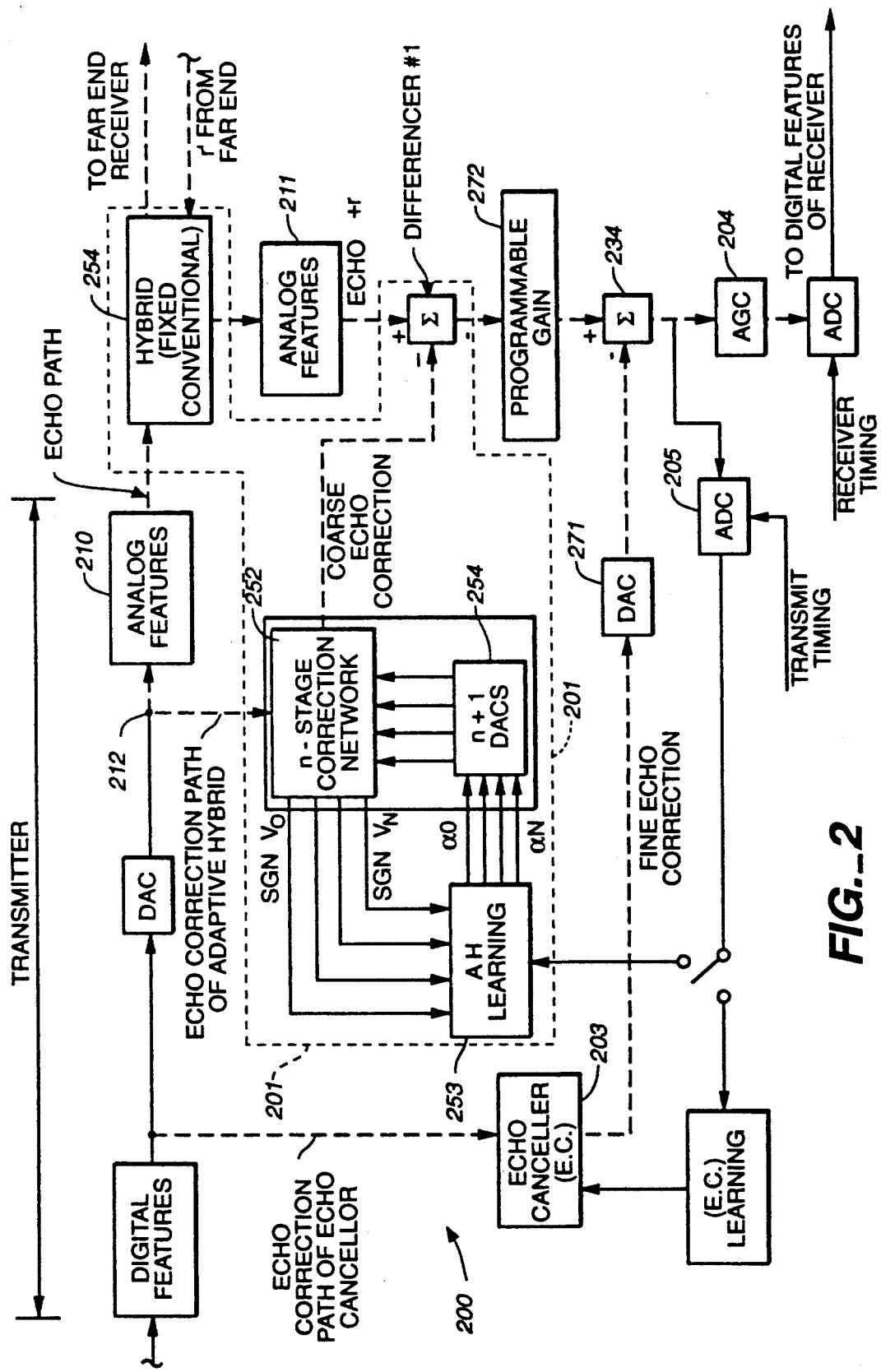
FIG._2

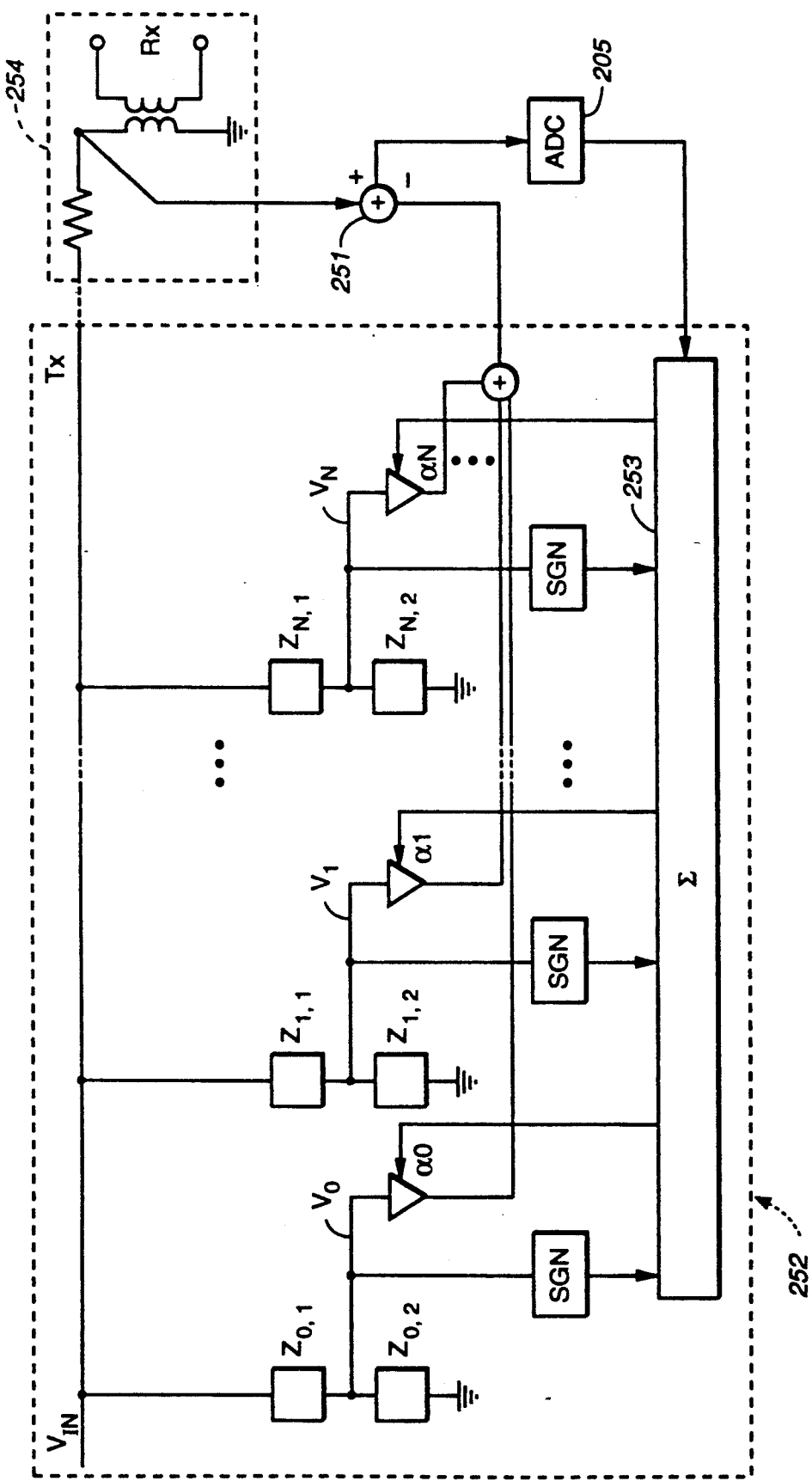
FIG._3

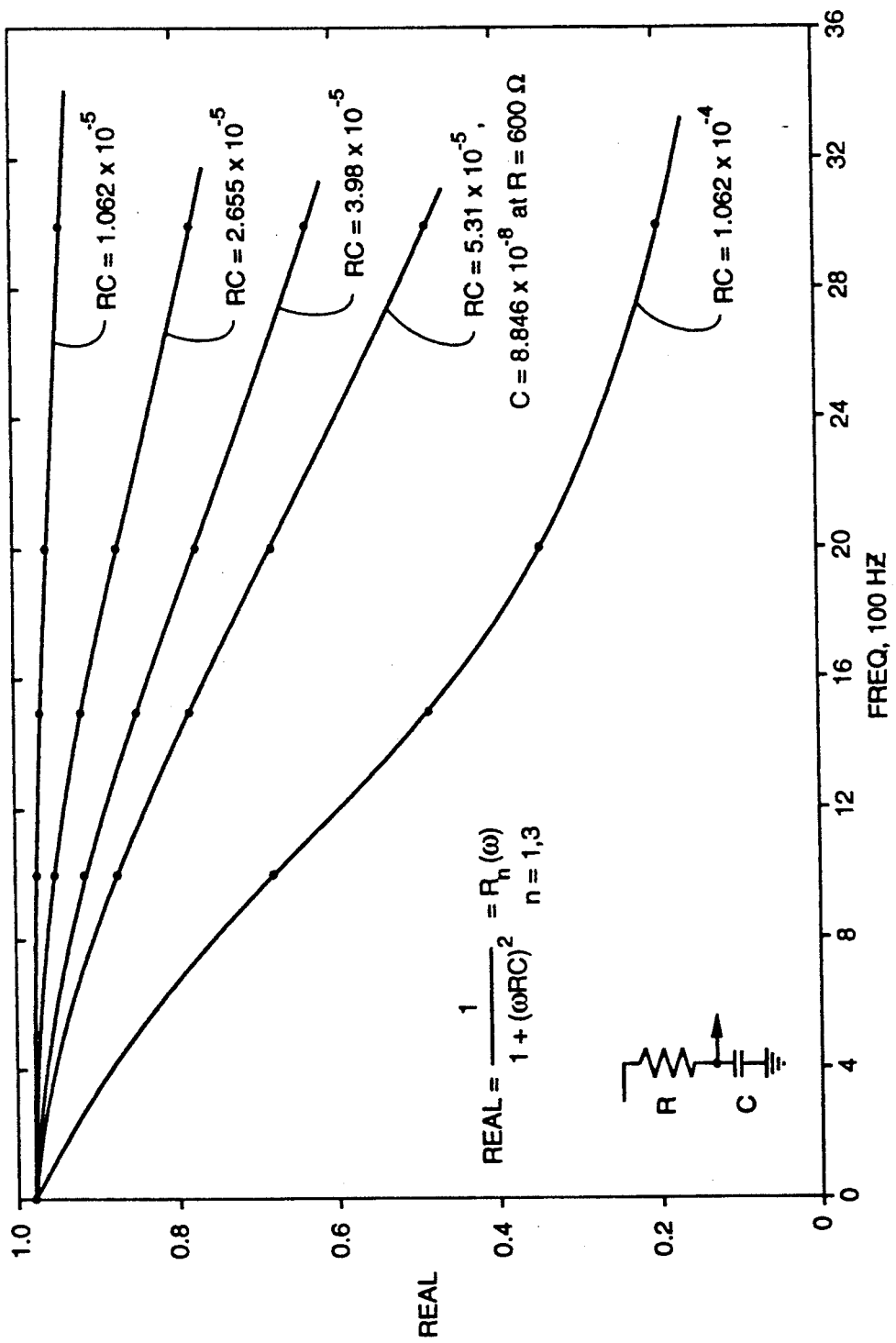
FIG._4

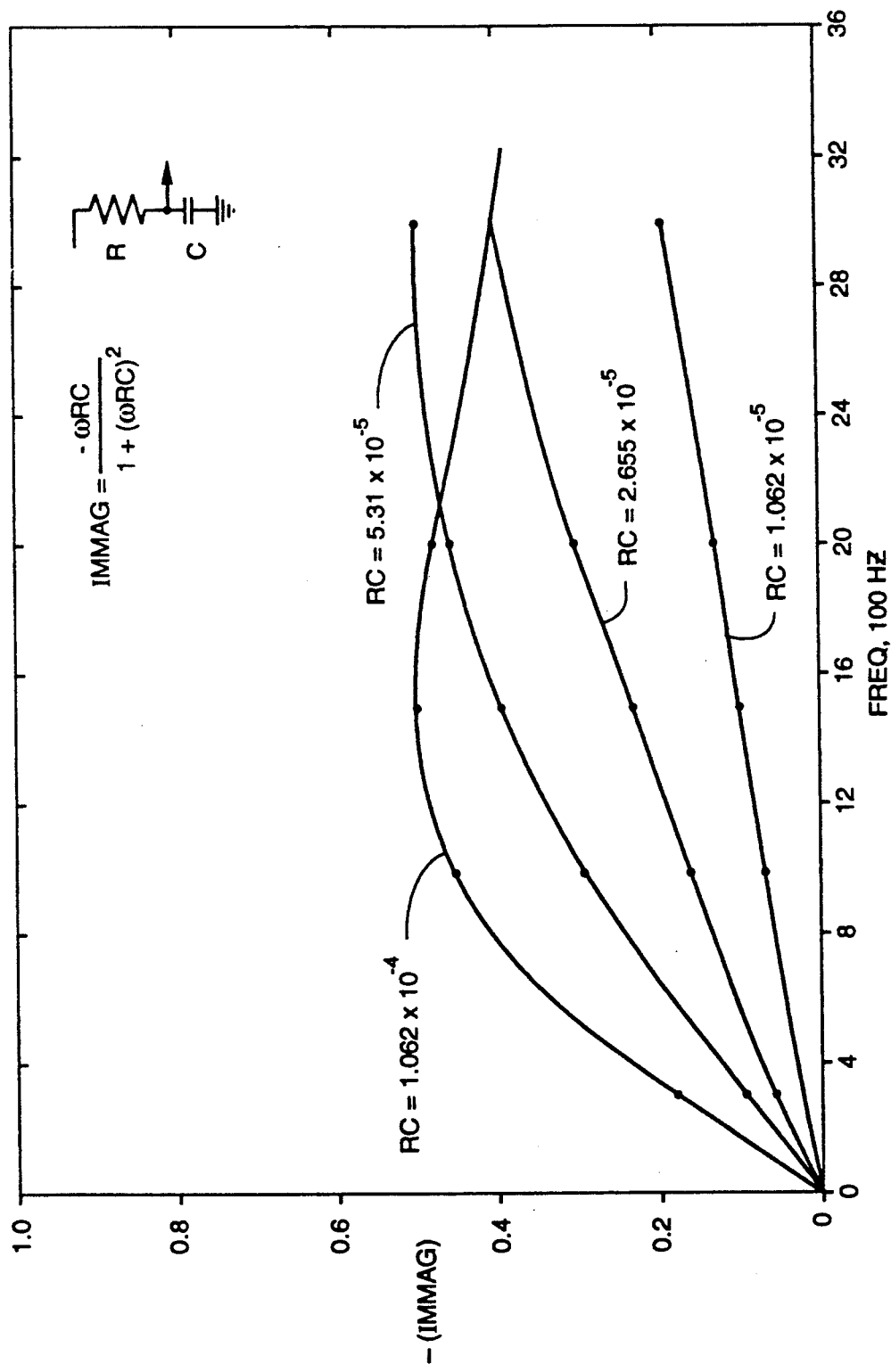
FIG._5

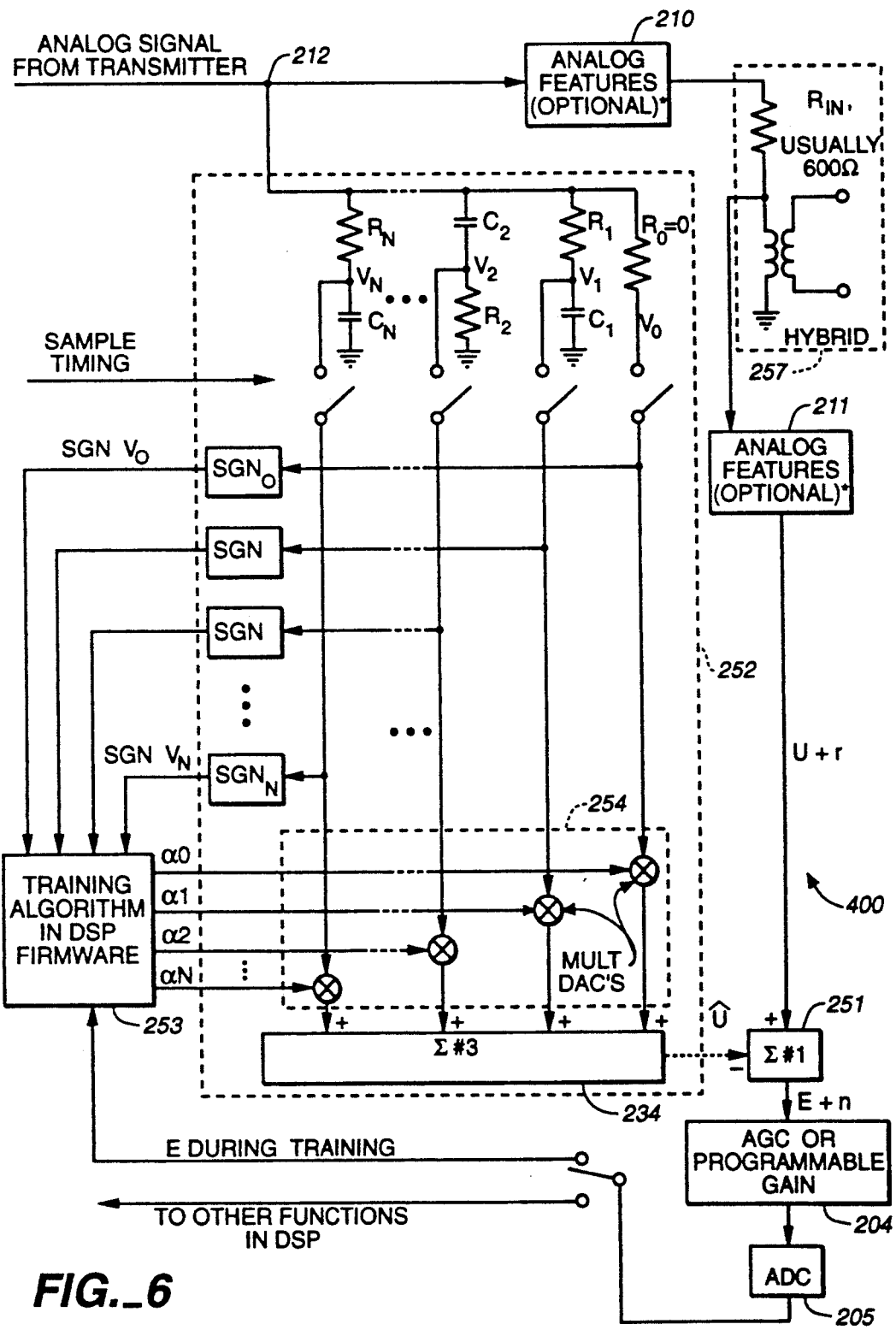
FIG._6

ADAPTIVE HYBRID

BACKGROUND

This invention pertains to adaptive hybrids which serve to, for example, eliminate or reduce "talker" echoes on telephone channels.

Prior art adaptive hybrids and their uses are described, for example, in Messerschmitt, David G., "An Electronic Hybrid for Adaptive Balance In Telephony," *IEEE Transactions on Comm.*, August 1980, pp. 1399; Dotter, et al., "Implementation of an Adaptive Balancing Hybrid," COM-28, p. 1408, August 1980; and White, Stanley A., "An Adaptive Electronic Hybrid Transformer," *IEEE Transactions on Comm.*," December 1972. However, the previous schemes have two major shortcomings:

1. They are not sufficiently versatile and effective against the widely differing echo path characteristics encountered on telephone channels.

2. The adaptive algorithms, in general, tend to be costly to implement on a per-stage basis; and the effectiveness is usually limited by using only one or two adaptive stages.

FIG. 1 shows a block diagram of a widely known prior art adaptive hybrid 100. Adaptive hybrid 100 is trained on the signal from the local transmitter received via port 103. This is usually done while the signal, normally received from the far end, is absent.

Filters 101 and 102 approximate the characteristics of nominal short and nominal long "near-end" echo paths, respectively. Interpolator 104 is automatically adjusted in response to the operation of adaptive algorithm 105 in an attempt to provide an echo estimate to summer 106 that closely approximates the echo. Circuit 106 subtracts the estimated echo from one output of the fixed hybrid, and this output normally includes echo plus received signal.

A major limitation of the prior art adaptive hybrid 100 of FIG. 1 arises from the fact that a substantial percentage of echo paths (even near-end echo paths) differ widely from any characteristic that is capable of being provided as an interpolation between the two filters 101 and 102. This fact is indicated by the scatter diagrams in Gresh, P. A. "Physical and Transmission Characteristics of the Customer Loop Plant" BSTJ, Vol. 48, pp. 3337-3385, December 1969; and Manhire, L. M. "Physical and Transmission Characteristics of the Customer Loop Plan," BSTJ, Vol. 57, pp 33-59, January 1978. Therefore, the prior art approach of FIG. 1 provides little, if any, attenuation of some echoes.

SUMMARY

Echo attenuation facilitates achievement of efficient, full-duplex data communications on two-wire channels, for example in a V.32 modem. While echo cancellation can be achieved without an adaptive hybrid, some major advantages can be achieved by using an adaptive hybrid in conjunction with echo cancellation. When needed, the adaptive hybrid reduces the amplitude range requirements on the echo canceller and on analog-to-digital conversion, thereby reducing overall cost. This reduction in range requirements reduces the digital word-size required for high-performance echo cancellation and reduces the bit-accuracy needed in the analog-to-digital converter. These reductions in needed word-size and bit accuracy substantially reduce implementation cost. In a V.32 modem, for example, the adaptive hybrid can make it feasible to use a readily available, 16-bit digital signal processor to implement a high-performance echo canceller.

Normally, the adaptive hybrid is used to reduce near-end echoes, which are usually much larger than far-end echoes. The echo canceller attenuates the remaining near-end echo and the far-end echo. Two major objectives are: (1) Cost effectiveness and (2) versatile, effective correction of echoes with various, realistic characteristics. Both objective are achieved in accordance with the teachings of this invention by employing simple but multiple stages. A special training algorithm is also used in accordance with the teachings of this invention.

BRIEF DESCRIPTION OF DRAWINGS

FIG. 1 is a block diagram of a typical prior art adaptive hybrid;

FIG. 2 is a block diagram one embodiment of an adaptive hybrid constructed in accordance with the teachings of this invention, shown within a modem structure as a means of example;

FIG. 3 is a block diagram depicting one embodiment of a correction network suitable for use in the embodiment of FIG. 2;

FIG. 3a is a diagram depicting an alternative connection of the correction network of FIG. 3;

FIG. 4 is a graph depicting one quadrature component of the frequency response of one stage of this invention;

FIG. 5 is graph depicting the other quadrature component of the frequency response of the same stage of this invention; and FIG. 6 is a block diagram depicting another embodiment of an adaptive hybrid constructed in accordance with the teachings of this invention.

DETAILED DESCRIPTION

Overview

In this specification, the following nomenclature is used.

U = Echo before correction
Û = Estimate of U
E = U -Û = Error in echo correction provided by the adaptive hybrid
r = Signal from remote transmitter
Sgn = Polarity of FIG. 2 is a block diagram depicting one embodiment of an adaptive hybrid 201 used within a V.32 modem 200, which will serve as but one example of a system constructed in accordance with the teachings of this invention.

The number of stages, N+1, can be selected for a particular application. In the V.32 modem, N=3 is a cost-effective choice. The choice of N involves a tradeoff of cost versus ability to highly and consistently attenuate echoes with various characteristics.

In the embodiment of FIG. 2, the echo path is from node 212 through analog features 210 and hybrid 254 to one or more reflection features along the transmission channel, from which the echo returns through hybrid 254 to analog features 211 and to differencer 251. The echo correction path provided by adaptive hybrid 201 is from node 212 through N+1 stage correction network 252, and then to differencer 251.

In one training procedure, adaptive hybrid 201 is trained before echo canceller 203 is trained. Thereafter, adaptive hybrid 201 remains fixed until a new training is called for. Alternatively, training of adaptive hybrid 201 can partly overlap in time with the training of echo canceller 203.

The learning feature of adaptive hybrid 201 of FIG. 2 automatically adjusts correction network 252 (which includes N+1 DACs subcircuit 254) so that its characteristics approximate those of the near-end, "talker" echo path. Then, since the same signal goes through both the echo path and correction network 252, a large part of the echo is cancelled in differencer 251. In one embodiment, adaptive hybrid learning subcircuit 253 is digital and is implemented in a digital signal processor (DSP), which can concurrently implement various other modem functions, if desired.

Correction Network

FIG. 3 depicts one embodiment of correction network 252 suitable for use in the embodiment of FIG. 2. The embodiment of FIG. 3 is an N+1 stage correction network shown with learning subcircuit 253 of FIG. 2 receiving digital information pertaining to voltage levels $V_O$ through $V_N$ and, in response thereto and the resulting signal from differencer 251, providing adjustable gain factors $a_O$ through $a_N$. The adjustable gain factors $a_O$ through $a_N$ are learned during training. In one embodiment, $a_O$ through $a_N$ then remain fixed during reception of subsequent signals, including data signals. In an alternative embodiment, one or more of $a_O$ through $a_N$ continually adapt during the reception of subsequent signals. Impedances $Z_{n-1}$, $Z_{n-2}$ associated with gain factor $a_n$ may be any suitable impedances, for example a resistor and a capacitor, respectively. The best selection of impedance values depends upon the application, but the following explains a general approach. An echo path characteristic can be represented in the frequency domain by $$H(\omega) = R(\omega) + jI(\omega), \quad \omega = 2\pi f \quad (1)$$

where $j = \sqrt{-1}$ while $R(\omega)$ and $I(\omega)$ represent two quadrature components, each a function of frequency. On some echo paths, which are to be corrected, $R(\omega)$ and $I(\omega)$ are curves that have large bends within the bandwidth of the transmitted signal. Then, the RC values in correction network 252 need to be relatively large. With large RC values, correction network 252 can be automatically adjusted, by adjusting the $a$'s so that this network coarsely approximates any desired $R(\omega)$ and $I(\omega)$ within wide limits. However, on more typical echo paths, $R(\omega)$ and $I(\omega)$ have lesser bends. Then, the RC values can be smaller in order to produce better accuracy of approximating the needed correction characteristic.

There is no generally optimum set of RC values and no definitely best RC selection procedure. However, RC values that lead to reasonably accurate correction of various echo path characteristics can be selected by trial-and-error, as explained below. Since the RC values need be selected only once for a particular application, trial-and-error is tolerable.

The characteristic that the adaptive hybrid corrects is the transfer function of the echo path, FIG. 2, which was given by Eq. (1). The transfer function of the n-th RC network of correction network 252 is $$H_n(\omega) = \frac{V_n(\omega)}{V_{in}(\omega)} = R_n(\omega) + jI_n(\omega) \quad (2)$$

The transfer function of the nth stage of correction network 252 is $a_n H_n(\omega)$.

In FIG. 3, the transfer functions of the individual stages (exclusive of the $a$'s) are given in Table 2.

TABLE 2

| Stage | $R_n(\omega)$ | $I_n(\omega)$ |
|---|---|---|
| 0 | 1 | 0 |
| 1 | $\dfrac{1}{1 + (\omega R_1 C_1)^2}$ | $\dfrac{-\omega R_1 C_1}{1 + (\omega R_1 C_1)^2}$ |
| 2 | $\dfrac{(\omega R_2 C_2)^2}{1 + (\omega R_2 C_2)^2}$ | $\dfrac{+\omega R_2 C_2}{1 + (\omega R_2 C_2)^2}$ |

Stage 3 is the same as Stage 1 except Stage 3 uses $R_3 C_3$ instead of $R_1 C_1$ and uses $a_3$ instead of $a_1$.

In the embodiment described in Table 2, the zeroth stage includes zero impedance $Z_{0,1}$ and an infinite impedance $Z_{0,2}$, thereby providing $R_n(\omega) = 1$ and $I_n(\omega) = 0$.

FIGS. 4 and 5 show, as examples, representative plots $R_n(\omega)$ and $I_n(\omega)$ for a stage of the type of stages 1 and 3.

The overall transfer function of correction network 252, with N+1 stages, odd N, is $$H_c(\omega) = R_c(\omega) + jI_c(\omega) \quad (3)$$

where $$R_c(\omega) = a_0 + a_1 R_1(\omega) + a_2 R_2(\omega) + \ldots + a_n R_N(\omega) \quad (4)$$

$$I_c(\omega) = a_1 I_1(\omega) + a_2 I_2(\omega) + \ldots + a_n I_N(\omega) \quad (5)$$

Now, before proceeding to describe a suitable RC selection procedure, understanding can be enhanced by observing that we could do the following:

1. Select any reasonable set of N of the RC values, where the values within this set differ widely from each other.

2. Select any realistic echo path for $R(\omega)$ and $I(\omega)$, for present illustrative purposes.

3. Select $$\frac{N+1}{2}$$

frequencies within the signal (and echo) bandwidth, assuming N is odd, for example. Good choices for a voice-band channel and for N=3, for example, are f=800 hertz and f=2800 hertz.

4. At each of the selected frequencies set $R_c(\omega) = R(\omega)$ and $I_c(\omega) = I(\omega)$. Thereby, obtain $$\frac{N+1}{2}$$

equations from Eq. (4) and $$\frac{N+1}{2}$$

equations from Eq. (5).

5. Solve the N+1 equations simultaneously for the $a$'s. This procedure gives correction characteristics, $R_c(\omega)$ and $I_c(\omega)$ that exactly equal the desired correction characteristics $R(\omega)$ and $I(\omega)$, respectively, at the two selected frequencies. Investigation of various cases has shown that, in general, at the other frequencies within the echo bandwidth, the echo will then be substantially reduced relative to no echo correction.

However, it is better to refine this procedure as follows, where $N=3$, for example. First, let us consider how to select three good RC values to use at the start of a trial-and-error refinement procedure. To do this, select about 3 or 4 echo path characteristics, $H(\omega)$, that differ widely from each other, but are all exceptionally severe. Start with one of these paths and estimate Mean $[R(\omega)]$, where the mean is taken across the echo bandwidth. Plot $R(\omega)$Mean$[R(\omega)]$ versus $\omega$. Compare the results with the curves of FIG. 4. Apply visual, coarse interpolation between the curves and select an associated RC value that, when used for stage 3, enables that stage alone to approximate $R(\omega)$Mean$[R(\omega)]$. Use this value for $R_3 C_3$ in the first RC set trial.

Next, set $R_1C_1=0.33R_3C_3$ and $R_2C_2=0.133\ R_3C_3$. Use equations such as those in Table 2 for $R_n(\omega)$ and $I_n(\omega)$, for $n=1, 2$ and 3. Substitute these equations into equations (4) and (5). Substitute two values of $\omega$ (say $\omega=1600\pi$ and $\omega=5600\pi$) into these equations and, at each of these values, set $R_C(\omega)=R(\omega)$ and $I_C(\omega)=I(\omega)$. Solve the resulting four equations simultaneously for the $\alpha$'s. Using these $\alpha$'s in Equations (4) and (5), solve for $R_C(\omega)$ and $I_C(\omega)$. Plot these characteristics and compare with the $R(\omega)$ and $I(\omega)$ of the selected severe echo path.

Repeat the above procedure with each of the other selected, severe echo paths. Observe the corrections of the severe paths and determine which of these paths is most poorly corrected, considering both $R(\omega)$ and $I(\omega)$. From observation of this most poorly corrected echo path, choose a new set of RC values, then try this set against all of the severe echo paths.

Try different sets of RC values; and, for each set, see how well correction network 252 corrects each of the severe echo paths. After a little practice, the results obtained from each set of RC values can be used to improve the next set, except when the RC set is near optimum. In addition to observing the accuracy of the correction, it is important to avoid any $|\alpha|<1$ in order to avoid implementation difficulty.

At each point in the procedure, a major objective should be to reduce the error in correction of that echo path which is most poorly corrected. This procedure should be continued until further trials result in little further improvement.

One alternative procedure is similar to the above except as follows: (1) It uses an adaptive hybrid and simulates each of several severe echo paths, then uses the adaptive algorithm described below to select the $\alpha$ set associated with each RC set. (2) It uses a spectrum analyzer to observe the error in the echo correction as a function of frequency. The characteristics of the individual stages preferably differ substantially from each other, in order to facilitate adaptivity.

In one embodiment of this invention suitable for use in a V.32 modem, the selection of RC values is depicted in Table 1.

TABLE 1

| |
| --- |
| $R_1C_1 = 5 \times 10^{-5}$ ohm-farads |
| $R_2C_2 = 2 \times 10^{-5}$ ohm-farads |

TABLE 1-continued

| |
| --- |
| $R_3C_3 = 1.5 \times 10^{-4}$ ohm-farads |

In applying any procedure for selecting the RC values, it should be noted that the adaptive hybrid might be used in conjunction with a fixed part of the hybrid, where the fixed part corrects some nominal curves of $R(\omega)$ and $I(\omega)$. The RC values in Table 1 are for use when the fixed part of the hybrid consists essentially of a 600 ohm resistor in series with the common hybrid transformer.

With the RC values in Table 1, correction network 252 has been applied analytically to various echo paths, some severe. The $\alpha$'s were obtained by solving simultaneous equations of the form of Equations (4) and (5), as described earlier. It has been found that correction network 252 consistently provides excellent accuracy of correction. A comparison of frequency-domain plots of characteristics of echo paths and echo correction indicates that correction network 252 can reduce the overall echo by at least 20 db on severe paths, and can reduce it by much more on most echo paths. These results have been verified by testing an experimental adaptive hybrid (using the adaptation algorithm to obtain the $\alpha$'s) on a few selected echo paths.

In an alternative embodiment, the structure of FIG. 3a is used except subsequent stages received their input signal from the common node of the impedances of the previous stage. Thus, for example, FIG. 3a depicts an alternative embodiment of FIG. 3, showing just the impedances and their interconnections.

Alternative Embodiment

FIG. 6 is a block diagram which depicts another embodiment of this invention. Circuit 400 of FIG. 6 includes a number of subcircuits which are numbered similarly to certain subcircuits in FIG. 2.

Analog features subcircuits 210 and 211 are not a part of the adaptive hybrid, but are included, if desired, for purposes such as filtering and scaling. During adaptive hybrid training, the signal r is ordinarily absent, so the output from fixed hybrid 254 consists mainly of echo U, although some noise is also present.

$N+1$ stages are shown, where each stage, except one, consists of a simple RC network and a multiplying DAC. Then, Summer 234 combines the outputs of the $N+1$ multiplying DACs 254 to provide an error correction signal $$\hat{U} = \sum_{k=0}^{N} (\alpha_k V_k) \qquad (6)$$

$\hat{U}$ is subtracted from $U+r$ by differencer #1. The training algorithm implemented by training algorithm subcircuit 253 adjusts the values of $\alpha_1$ through $\alpha_n$, in order that $$\hat{U} \approx U, \text{ approximately,} \qquad (7)$$

so the bulk of the near-end echo is corrected. In one embodiment, differencer 251 is implemented utilizing switched capacitor techniques, as is well known in the art.

The voltages $V_O$ through $V_N$ and the input signal to ADC 205 are typically sampled at the same rate. Typically, the sampling rate is 7200 or 9600 sps for voice-band signals, although any suitable sampling rate can be used.

The subcircuits labeled $Sgn_O$ through $Sgn_N$ provide polarities of samples of voltages $V_O$ through $V_N$, respectively, to training algorithm subcircuit 253. A major advantage of the algorithm of this invention is that it can make these one-bit numbers $SgnV_O$ through $Sgn_N$ suffice.

In an alternative embodiment of this invention, a typical prior art learning algorithm for echo cancellation and adaptive equalization is used in an adaptive hybrid in conjunction with the correction network constructed in accordance with the teachings of this invention. However, this alternative embodiment requires analog-to-digital conversion of each sample of $V_O$ through $V_N$, with several bits of accuracy per conversion. The novel algorithm of this invention which allows simple polarity decisions to be used instead of multi-bit analog-to-digital conversions is now described.

The Algorithm For Learning

One embodiment of a novel algorithm for learning (or "training") of the adaptive hybrid of this invention is now described. The novel algorithm of this invention is suitable for implementation in dedicated circuitry or in a digital signal processor (DSP). If desired, the adaptive hybrid can time-share the DSP with various other modem functions.

For most purposes, the adaptive hybrid should be trained with a random, or nearly random, signal. Then, after its training, it will work with various types of signals (such as data signals, tones, and repetitive patterns) when transmitted by the local transmitter. However, if and when the Adaptive Hybrid is to be used with only one type of signal, it will perform better after being trained on that type of signal. The following embodiments of the algorithms of this invention apply generally to various types of locally transmitted signals, and are also highly suitable for training on the signal specified by CCITT for echo canceller and/or equalizer training in the V.32 modem. The first part of the time span of the CCITT echo canceller training signal is used for the adaptive hybrid training. The adaptive hybrid adaptive training time varies, but is about 50 to 100 milliseconds in the V.32 modem.

In a simple embodiment of the learning algorithm, each gain coefficient $a_O$ through $a_N$ is updated once each sample time, as follows:

$$(\Delta a)_{m,n} = k E_m Sgn V_{m,n} \pm k |E_m| \quad (8)$$

$$a_{m,n} = a_{m-1,n} + (\Delta a)_{m,n} \quad (9)$$

where
is a small constant
m refers to the $m^{th}$ sample
n refers to the $n^{th}$ stage
$V_n = n^{th}$ stage signal at one input to a multiplying DAC
$E_m = $ Output error $= U_m - \hat{U}_m + N_m$
$U_m = m^{th}$ echo sample
$\hat{U}_m = m^{th}$ echo correction sample
$N_m = $ Instantaneous value of noise component of the $m^{th}$ sample
Initially, $a_O = 0.5$, $a_n = 0$ for $n \neq 0$ in the simplest case.
In one embodiment, a refined version of the algorithm described above is used:

$$(\Delta a)_{m,n} = K_q \sum_{p=m-31}^{m} (E_p Sgn V_{p,n}) \text{ for } m = 0, 4, 8, \text{ etc.} \quad (10)$$

Updating of gain coefficients occurs once every four sample times and each update is based upon the last 32 values of $E_p Sgn V_{p,n}$. This embodiment improves each updating loop characteristic. Also, it reduces the digital word size requirement, compared to the simple embodiment described above, because it allows the error E to become smaller before $\Delta a$ becomes smaller than the least significant bit.

Also, instead of a constant, $k_q$ is reduced once every 32 sample times, as follows:

$$k_q = I(a)^q, q = \frac{m}{32} \quad (11)$$

and m=0 at the start of training. Typical values are I=0.05 and a=0.96. This procedure allows the training to proceed rapidly at first, then slow down for higher precision.

Various alternative embodiments of this algorithm are contemplated. For example, in one embodiment, the individual stages employ different values of I and/or q in Equation (11). In an alternative embodiment, the number 32 and/or the frequency of updating is altered.

The following shows the basis of the correction. Let the echo path characteristic be $R(\omega) + jI(\omega)$, $j = \sqrt{-1}$. Each (nth) corrector stage has a characteristic $R_n(\omega) + jI_n(\omega)$. The overall corrector has the characteristic $R_c(\omega) + jI_c(\omega)$, given by Equations 3, 4 and 5.

For a given, realistic echo path, the $a$'s can be adjusted so that $R_c(\omega)$ approximates $R(\omega)$ and $I_c(\omega)$ approximates $I(\omega)$. Then, the correction network characteristic approximates the echo path characteristic, as desired.

The basis of the learning algorithm is easier to understand if we start first with the simple version, Equations 8 and 9.

Let $g_p$ be the optimum of $a_p$, then, neglecting noise $$E_m Sgn V_n = \sum_p [(-a_{m,p} + g_p) V_p] Sgn V_n \quad (12)$$

For the case of $p=n$, $V_n Sgn V_n$ is always positive. Therefore, from Eq(12), the term $(-a_{m,n} + g_n)V_n Sgn V_n$ consistently has the correct polarity to reduce the error, $a_n$, in the $n^{th}$ stage. In the case of a random data signal, for example, the effects of the terms where $p \neq n$ tend to average to relatively small values, except when some of the other stages error, some of the $\{g_p - a_p\}$, $\neq n$, predominate. In the case where all of the individual stage errors are nearly equal, since the increments (the $\{\Delta a\}$) are very small, each $a$ is driven generally in the correct direction; i.e., considerably more than half of the increments will be in the correct direction until the errors become very small. When some of the individual stage errors predominate, these errors will be driven relatively strongly toward zero until they cease to predominate.

The updating of each stage, each $a$, can be visualized as an acquisition loop. The refined algorithm based upon Eq(10) improves each updating loop characteristic. Also, it reduces the digital word size requirement, compared to the simple version, because it allows the error E to become smaller before $\Delta a$ becomes smaller than the least significant bit.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims. For example, in the embodiment of FIG. 2, the fine echo correction can be eliminated, if desired, simply by eliminating digital to analog converter 271, differencer 234, and associated error correction learning. In addition or alternatively, the programmable gain stage 272 can be eliminated, if desired, as can AGC stage 204.

What is claimed is:

1. An adaptive hybrid comprising:
    a first input port for receiving a received signal from a transmission channel;
    a second input port for receiving an input signal from a transmitter;
    a correction feature comprising a differencer having a first input port coupled to said first input port of said adaptive hybrid for receiving said received signal from said transmission channel, a second input port coupled to said second input port of adaptive hybrid for receiving a an echo correction signal, and an output port serving as said output port of said adaptive hybrid and providing the difference signal between said received signal from said transmission channel and said echo correction signal, said difference signal serving as an analog error signal;
    an echo correction feature comprising:
    a plurality of analog impedance networks greater than two, connected in parallel, each network having an input port coupled to said input port of said adaptive hybrid and having an output port;
    a gain stage having a controllable gain stage having an input port coupled to said output port of its associated impedance network, and an output port;
    a summer having a plurality of input ports, each being coupled to the output port of an associated one of said gain stages, and an output port serving as an output port of said echo correction feature for providing said echo correction signal, and being coupled to said second input port of said differencer; and
    means for altering the gain of said gain stages in order to provide a desired correction of said signal from said differencer; and
    control means for establishing a desired gain of said gain stages, comprising:
    a plurality of sign blocks, each having an input connected to said output port of an associated of one of said impedance networks and an output port for providing an output signal representative of the polarity of the signal applied to said input;
    an analog-to-digital converter for converting said analog error signal from said output port of said differencer to a digital value; and
    a processor coupled to receive said digital value of said analog error signal and said output signals from said sign blocks and in response thereto modifying the gains of said gain stages, wherein the gain of each of said gain stages is periodically incremented in proportion to the product of said error signal at the output signal of an associated sign block.

2. An adaptive hybrid as in claim 1 wherein the gain values of the individual gain stages are modified according to the following equation:

$$a_{m+1,n} = a_{m,n} + k\, E_m\, \text{Sgn}[V_{m,n}];$$

where
$a_n$ is the gain of the nth gain stage;
k is a small constant;
m refers to the mth sample;
$V_{m,n}$ is the output signal of the nth network; and
$E_m$ is the error signal from said differencer.

3. An adaptive hybrid as in claim 1 wherein the gain of each individual stage is incrementally changed once every M sample times by an amount $$(\Delta a_{m,n}) = k_q \sum_{p=m-Q+1}^{m} (E_p \text{Sign} V_{p,n})$$

for m = 0, M, 2M, 3M, ...

4. An adaptive hybrid as in claim 3 wherein M = 4 and Q = 32.

5. An adaptive hybrid as in claim 3 wherein $k_q$ is reduced once every Q sampling time intervals, as follows:

$$k_q = I(a)^q,\ q = m/Q$$

6. An adaptive hybrid as in claim 5 wherein I = 0.05, a = 0.95, and m = 0 at the start of training.

7. An adaptive hybrid as in claim 3 further comprising a digital implemented echo canceller.

8. An adaptive hybrid as in claim 1 wherein each said impedance network consists of one resistor and one capacitor, wherein each impedance network forms either an integrator or a differentiator, and wherein the impedance value differ from network to network, and the selected combination of impedances is suitable to obtain effective echo cancellation from the adaptive hybrid.

9. An adaptive hybrid as in claim 1 wherein said input signal travels through and is modified by only analog features before arriving at said second input port of said differencer.

* * * * *